UNITED STATES PATENT OFFICE.

E. F. PRENTISS, OF PHILADELPHIA, PENNSYLVANIA.

IMPROVEMENT IN SOLUTIONS FOR CLEANSING WOOLENS, &c.

Specification forming part of Letters Patent No. 20,661, dated June 22, 1858.

*To all whom it may concern:*

Be it known that I, ELIJAH FREEMAN PRENTISS, of the city of Philadelphia and State of Pennsylvania, have invented a new and useful Improvement in the Materials for Process of Fulling and Cleansing Goods; and I do hereby declare the following to be a full and exact description of the same.

My improvement consists in the mode of preparing and using the material hereinafter described, which is a form of silicate of soda specially adapted to be used for fulling and cleansing, in the manner hereinafter described, as a substitute for soaps, alkali, urine, and other materials.

In the operation of fulling woolen goods it is necessary that the goods should be thoroughly cleansed from all grease. This is ordinarily effected by alkali and soap. Stale urine is also employed for softening and cleansing the goods. Soap will not of itself cleanse the grease from the wool, and although a preparation of silicate of soda has been heretofore attempted to be made up into a soap, yet it does not possess the cleansing or softening property of the material made and used as hereinafter described.

The preparation of silicate of soda, as hereinafter described, when used in the manner hereinafter described, has the effect by itself of cleansing thoroughly the woolen goods, dispensing with the use of any alkali, and also with the use of soap, and dispensing with a large amount of labor.

In preparing my solution of silicate for fulling and washing I employ a mixture of one pound of soda-ash, free from salt, and two of clean white sand; or I employ a mixture of sulphate of soda, charcoal, and white sand. The materials are ground together and fused in a furnace similar to a glass-furnace, and the same kind of pot as used by glass-makers. The time required to fuse it is about ten hours with an intense heat. The fused paste is removed from the pot with iron ladles, and immediately treated with cold water to soften it. It is then crushed between rollers and ground, then dissolved in hot water, and evaporated down to a consistency of 30° Baumé, and is then ready for use.

In applying this preparation for fulling purposes I use it instead of alkali, with or without a small quantity of common soap, and in the proportion of ten gallons of water to one of the above-prepared solution. No urine or any other article is necessary in fulling with the silicate solution, as it possesses the property of both cleansing and softening. This solution is to be used for washing purposes instead of soap, as follows:

One pint of the above-prepared solution is to be mixed with eight gallons of warm water. Soak the clothes in this over night, then boil them, as is usually done in the ordinary mode of washing, in the same liquor, and then rinse out in cold water. For cleansing wool the operator will have to be governed by the dirtiness of the wool. For ordinarily-dirty wool use one gallon of liquor to thirty-two gallons of hot water—say at one hundred and twenty degrees (120°) Fahrenheit. After cleansing two or three lots of wool add a small portion of the same solution, and go on scouring in the same tub and liquor continually. The solution improves in its cleansing properties all the time, as in losing its original strength it acquires softness, and, adding new solution occasionally, the old liquor is used a long time. The dirt precipitated to the bottom can be scraped out with a ladle or any convenient article. For scouring cloth use ten gallons of water to one gallon of the liquor.

The advantages of the use of silicate-of-soda solution, when prepared and used as above described, are that it is much more economical, requires much less labor and time, and possesses a greater power of cleansing and softening the fabric. It possesses the advantage over solutions of alkali by leaving the goods in a softer state, and the power also of removing the gum from the wool in scouring it, which no silicated soap, common soap, or alkali possesses.

Having thus described my invention, I do not desire to claim the employment of silicate of soda as an ingredient in the manufacture of soap, as that has been tried before; nor do I claim any mode of making alkaline silicates, nor yet the solutions of alkaline silicates with chlorine or chlorides for bleaching and finishing textile fabrics, as these do not possess the cleansing properties of my solution prepared and used as above described; but

What I claim, and desire to secure by Letters Patent, is—

The employment of silicate-of-soda solution by itself, when prepared and used substantially as above described, for cleansing and softening the fabrics in the fulling-mill or wash-tub as a wash mixture.

E. FREEMAN PRENTISS.

Witnesses:
JAMES H. STIMPSON,
JNO. B. KENNEY.